(12) United States Patent
Pompa et al.

(10) Patent No.: US 7,931,285 B2
(45) Date of Patent: Apr. 26, 2011

(54) TAG AXLE ATTACHMENT FOR AN OFF ROAD AGRICULTURAL APPLICATOR VEHICLE

(75) Inventors: John Pompa, Jackson, MN (US); Jared Anderson, Jackson, MN (US); Jeremy Jacobus, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 172 days.

(21) Appl. No.: 12/369,258

(22) Filed: Feb. 11, 2009

(65) Prior Publication Data

US 2010/0201092 A1     Aug. 12, 2010

(51) Int. Cl.
*B62D 61/12*     (2006.01)
(52) U.S. Cl. .............. 280/86.5; 180/24.02; 180/209; 280/81.1
(58) Field of Classification Search .......... 180/24.02, 180/209; 280/81.1, 86.5
See application file for complete search history.

(56) References Cited

U.S. PATENT DOCUMENTS

| | | | | |
|---|---|---|---|---|
| 2,974,976 A * | 3/1961 | Lyall | ................... | 280/86.5 |
| 3,096,995 A * | 7/1963 | Richnow, Jr. | ................ | 280/682 |
| 3,257,124 A * | 6/1966 | Mendez | ................... | 280/407.1 |
| 3,317,193 A * | 5/1967 | Buelow et al. | ................ | 366/68 |
| 3,342,141 A * | 9/1967 | Browne | ................... | 105/215.2 |
| 3,649,981 A * | 3/1972 | Woodworth | ................ | 15/83 |
| 3,860,256 A * | 1/1975 | Jackson et al. | ............. | 280/81.1 |
| 3,877,715 A * | 4/1975 | Thayer et al. | ............. | 280/81.6 |
| 3,895,818 A * | 7/1975 | Fearon | ................... | 280/81.1 |
| 3,912,293 A * | 10/1975 | Harbers | ................... | 280/81.1 |
| 3,936,072 A * | 2/1976 | Mandel | ................... | 280/686 |
| 4,079,798 A * | 3/1978 | Ferris | ................... | 180/24.02 |
| 4,084,833 A * | 4/1978 | Mohrbacker et al. | ........ | 280/81.6 |
| 4,102,424 A * | 7/1978 | Heinze | ................... | 180/24.02 |
| 4,171,830 A * | 10/1979 | Metz | ................... | 280/86.5 |
| 4,195,856 A * | 4/1980 | Larson et al. | ............. | 280/81.1 |
| 4,256,326 A * | 3/1981 | Cantrell et al. | .......... | 280/683 |
| 4,576,390 A * | 3/1986 | Vos | ................... | 280/43.23 |
| 4,848,783 A * | 7/1989 | Christenson et al. | ...... | 280/405.1 |
| 5,332,258 A * | 7/1994 | Buttner | ................... | 280/86.5 |
| 5,370,196 A * | 12/1994 | Bishop | ................... | 180/24.02 |
| 5,718,443 A * | 2/1998 | St. Onge | ................ | 280/405.1 |
| 5,823,629 A * | 10/1998 | Smith et al. | ............. | 298/23 R |
| 6,073,946 A * | 6/2000 | Richardson | ............. | 280/86.5 |
| 6,189,901 B1 * | 2/2001 | Smith et al. | ............. | 280/86.5 |
| 6,371,227 B2 * | 4/2002 | Bartlett | ............. | 180/24.02 |
| 7,398,981 B1 * | 7/2008 | Ener et al. | ................ | 280/86.5 |

FOREIGN PATENT DOCUMENTS

GB     2134052 A  *  8/1984

* cited by examiner

*Primary Examiner* — Paul N Dickson
*Assistant Examiner* — Laura Freedman (57) ABSTRACT

The present invention provides a tag axle attachment for an off-road agricultural vehicle. The tag axle attachment allows agricultural vehicles to meet roadway weight restrictions imposed by the federal and state governments while also allowing the vehicle to perform optimally in the field. The tag axle is assembled such that it can be hydraulically lowered into a deployed position when the agricultural vehicle is on the roadway and hydraulically raised into a stowed position when the agricultural vehicle is in the field. The tag axle assembly is mounted to the chassis rails of an agricultural vehicle and positioned to fit between the chassis rails when stowed and minimizes the load per axle of the vehicle when deployed.

21 Claims, 15 Drawing Sheets

TAG AXLE ATTACHMENT FOR AN OFF ROAD AGRICULTURAL APPLICATOR VEHICLE

TECHNICAL FIELD

The present invention relates generally to the field of agricultural vehicles, and more particularly, to a tag axle attachment for an off road agricultural applicator vehicle.

BACKGROUND

When operating agricultural vehicles on public roads, operators must abide by vehicle weight restrictions imposed by state and federal governments. Vehicle weight restrictions are government imposed to reduce damage to roadways caused by heavy vehicles and minimize fatal accidents. Most commonly, vehicle weight restrictions are measured in terms of load per axle and the overall spacing between axles. Thus, if the number of axles on the vehicle and the spacing thereof is increased, a given vehicle may carry more weight than would otherwise be permitted.

To satisfy vehicle weight restrictions, an agricultural vehicle can be made smaller to alleviate the weight per axle of the vehicle. This is not an adequate solution, however, because small agricultural vehicles fail to meet the needs of farmers operating the vehicles in the field. Another option is to add a permanent axle to the agricultural vehicle, which would distribute the weight of the vehicle to more axles and would in turn decrease the weight per axle of the vehicle. This is not a desirable solution because an additional permanent axle may impede the operation of the vehicle when in the field. A third option is to add an axle that can be deployed to engage the road only when necessary. This axle is commonly called a "tag axle." A tag axle is an axle that can be deployed from a stowed position when necessary to distribute the weight of a vehicle over more axles thereby reducing the weight per axle of the vehicle.

Tag axles are commonly used on large commercial trucks, many of which often travel through many states, with each state having its own weight restrictions. Although tag axles are commonly used for large commercial trucks, they are not used for agricultural vehicles. Accordingly, there is a need in the art for a device that allows an agricultural vehicle to optimally operate both on the field and on roadways without exceeding weight restrictions. Unfortunately, conventional tag axles are not suitable for agricultural use due to incompatibility with agricultural vehicles and potential interference with the ground when used off-road. Therefore, there is a need for a tag axle that is compatible with agricultural vehicles yet also does not interfere with off-road operation.

BRIEF SUMMARY OF THE INVENTION

It is a primary objective of the present invention to provide a tag axle for an off-road agricultural vehicle. The tag axle enables agricultural vehicles to meet roadway weight restrictions imposed by the federal and state governments while also allowing the vehicle to optimally perform in the field. The tag axle is preferably provided such that it can be hydraulically lowered into an operational position when the agricultural vehicle is on a roadway and hydraulically raised into a stowed position when the agricultural vehicle is operating off-road.

The tag axle assembly can have one or more wheel assemblies depending on the weight and configuration of the agricultural vehicle. In some embodiments, the tag axle assembly can be used on, for example and not a limitation, three, four, or six wheeled agricultural vehicles. The tag axle can be centrally aligned with the rear axle, which allows for optimal operation of the agricultural vehicle when the tag axle is lowered to the operational position. The width of the tag axle is preferably narrow enough to fit between the chassis rails of the agricultural vehicle so that when the tag axle is stowed, it does not interfere with the operation, e.g., the ground clearance, of the agricultural vehicle in the field. When deployed in the operational position, the tag axle successfully decreases the agricultural vehicle's overall weight per axle.

These and other features as well as advantages, which characterize the various embodiments of the present invention, will be apparent from a reading of the following detailed description and a review of the associated drawings.

DETAILED DESCRIPTION OF PREFERRED EMBODIMENTS

Referring now to the drawings, in which like numerals represent like elements, exemplary embodiments of the present invention are herein described.

FIGS. 1A-D are illustrations of a tag axle 100, in accordance with an exemplary embodiment of the present invention, installed behind the rear axle 102 and in between two chassis rails 101 of the agricultural vehicle. Those of skill in the art will appreciate that the vehicle shown is but one example of a suitable vehicle for use with the tag axle of the present invention. The tag axle 100 is preferably attached proximate to the rear of the chassis rails 101 by a mounting bracket. Moreover, the tag axle 100 is preferably centrally aligned with, and located behind, the rear axle 102. In other words, the tag axle 100 is preferably located behind the rear axle 102 and in between the two rear wheels 104 located at proximate ends of the rear axle 102. This preferred location allows the tag axle 100 to absorb some of the load from the rear axle 102 thereby reducing the overall weight per axle of the agricultural vehicle. In vehicles having an alternative chassis design, the tag axle may be positioned in alternate locations based on the desire to allow tag axle operation without significantly compromising ground clearance when in off-road environments.

Figure 1A:
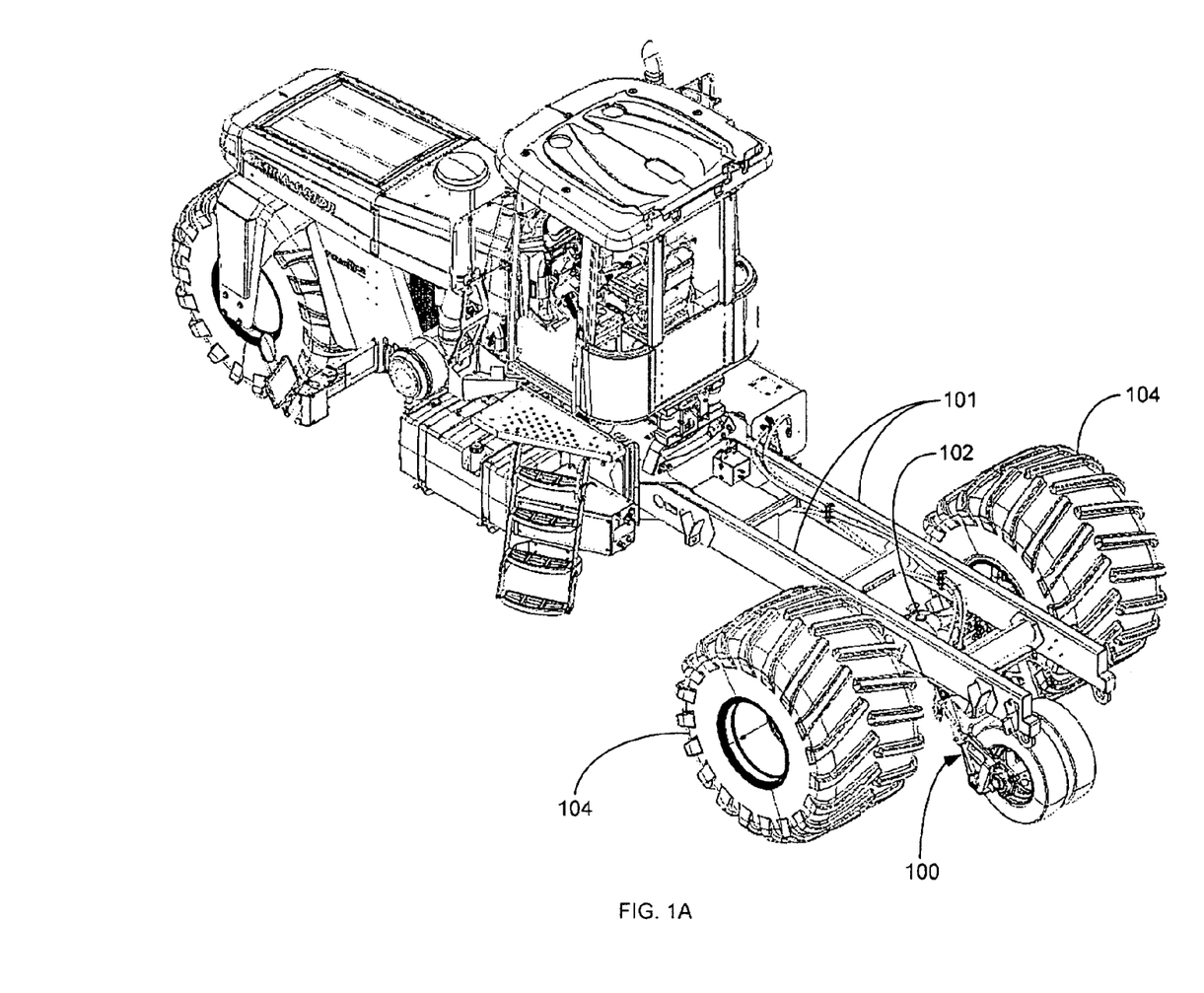
FIGS. 1A-D are illustrations of a tag axle, in accordance with an exemplary embodiment of the present invention, installed behind the rear axle and in between two chassis rails of the agricultural vehicle.
Figure 1B:
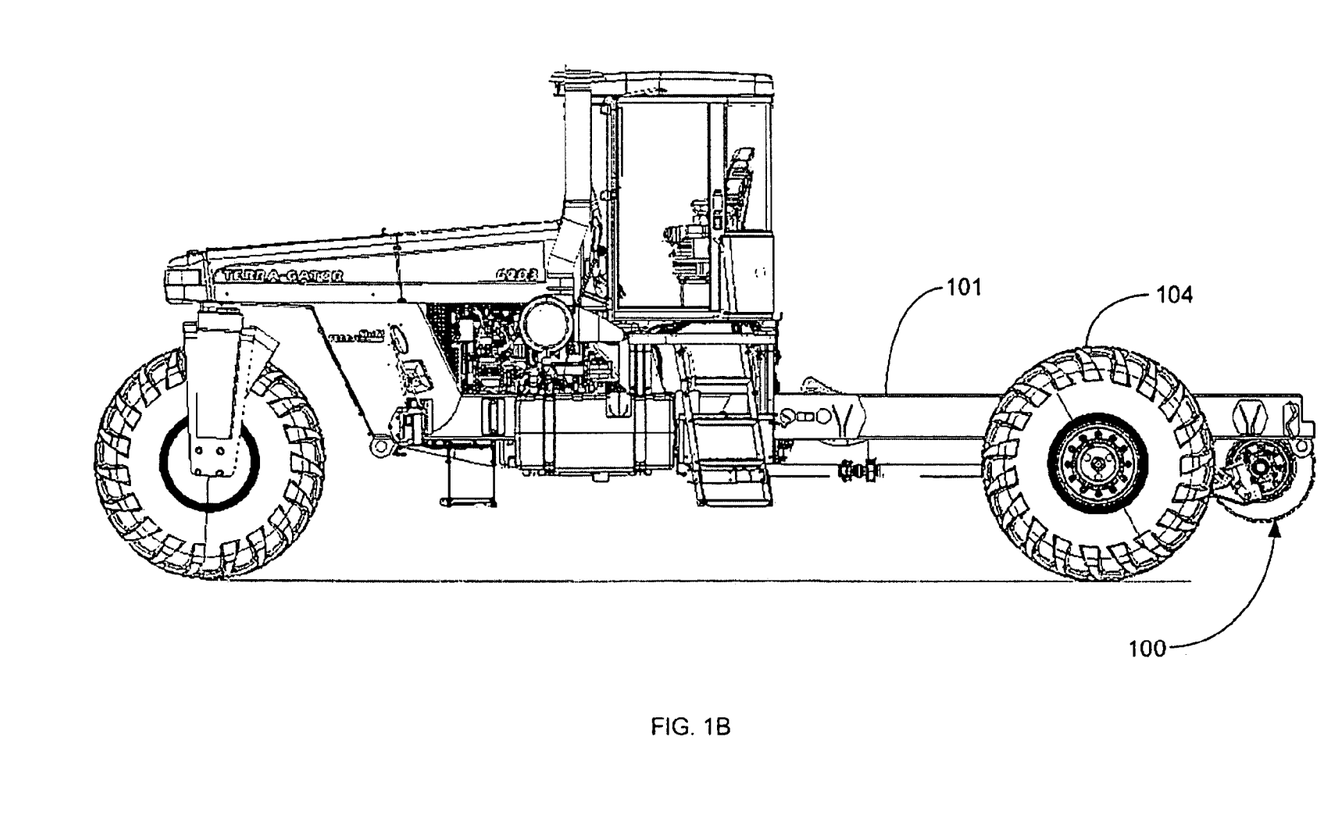
Figure 1C:
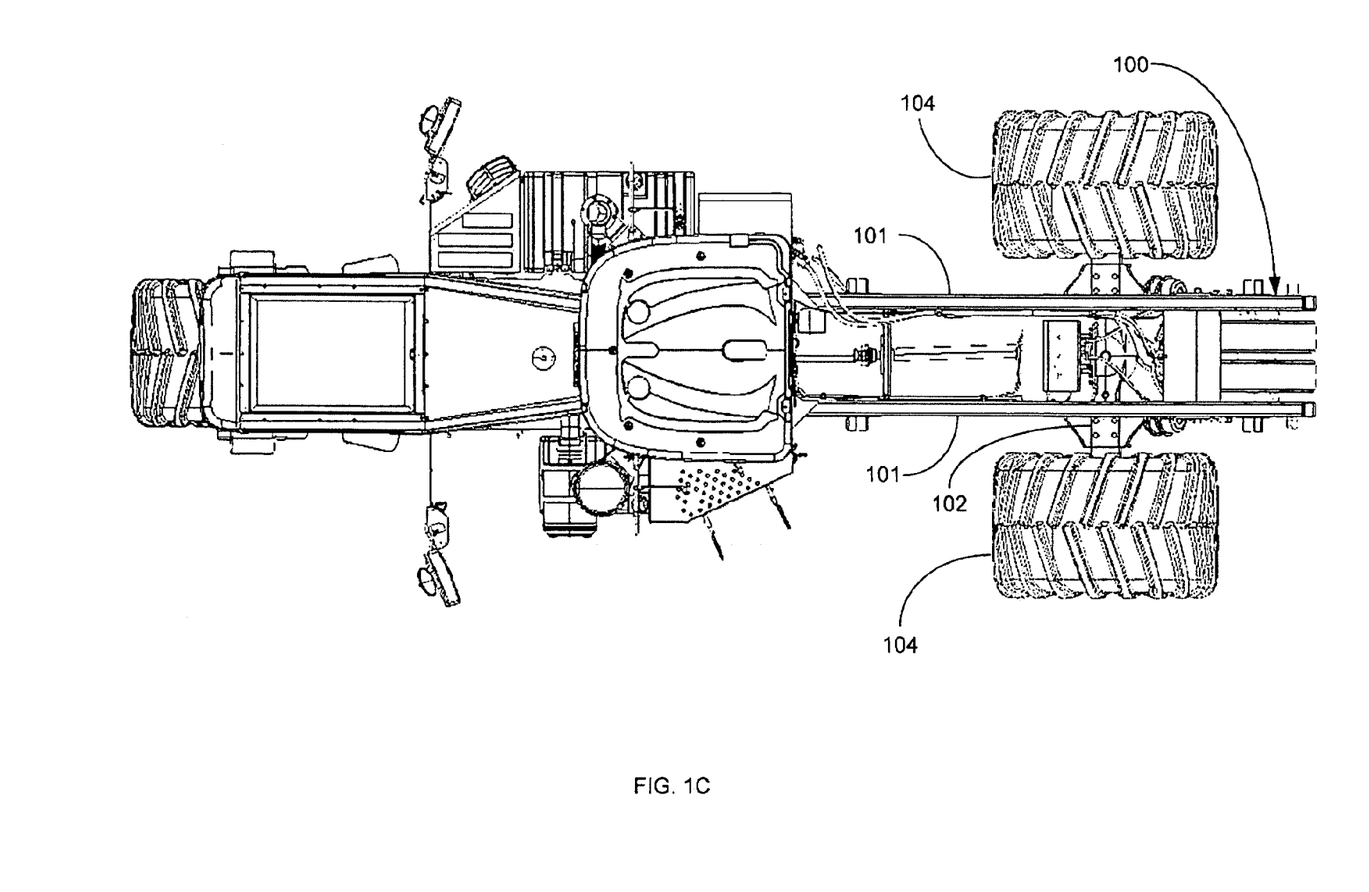
Figure 1D:
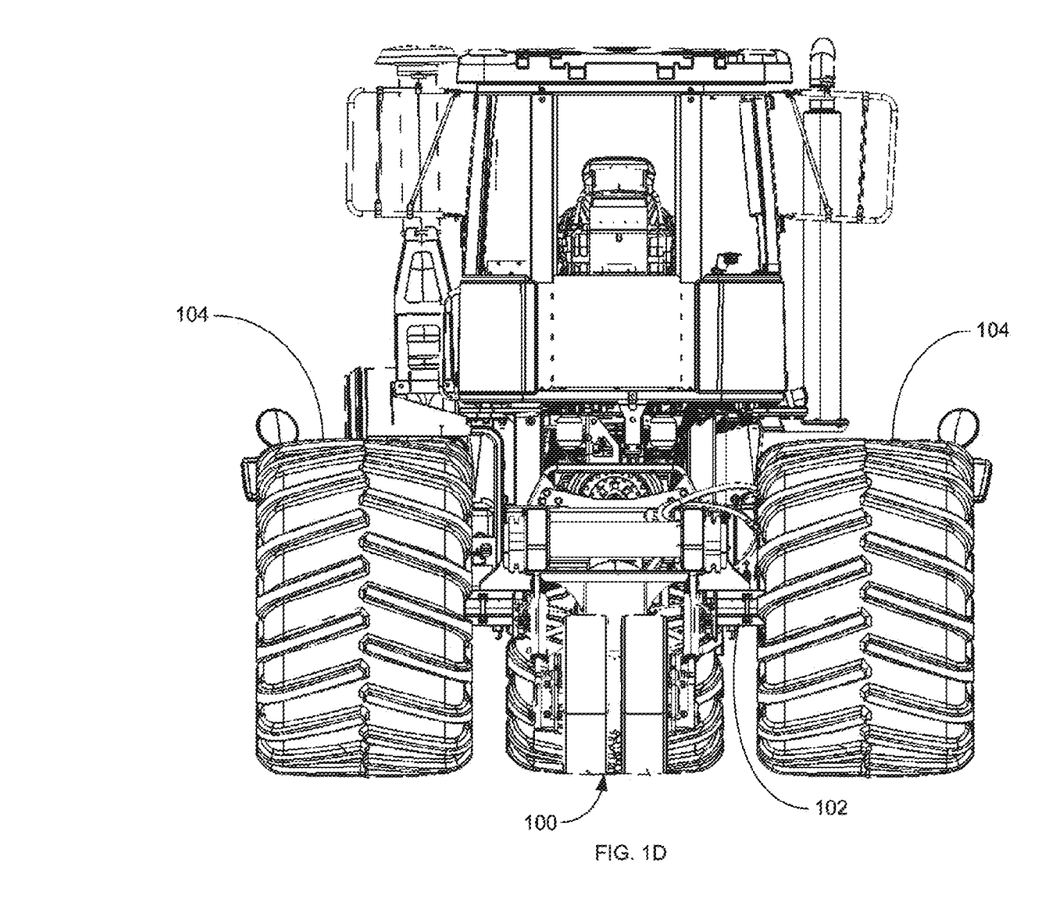
Figure 2:
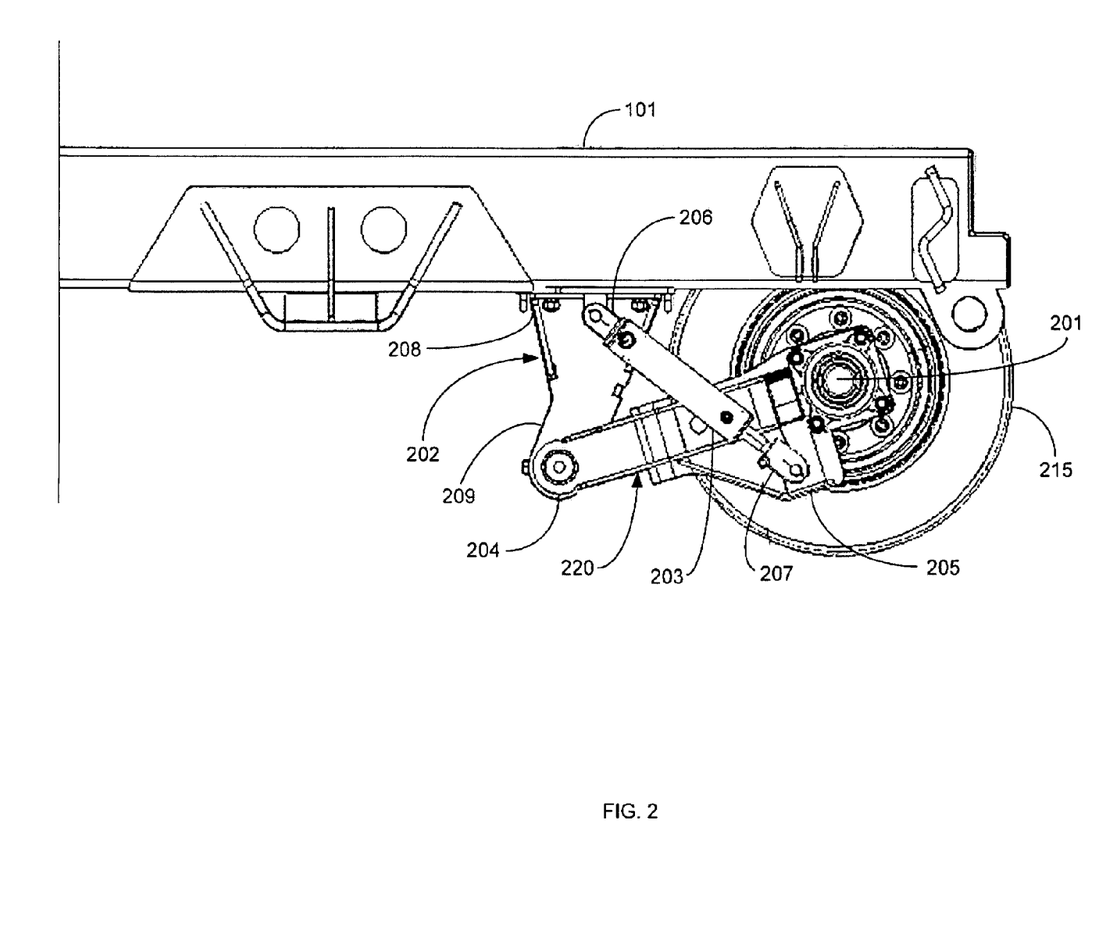
FIG. 2 is a left side sectional-view illustration with the rear axle removed of a tag axle, in accordance with an exemplary embodiment of the present invention, in the stowed position attached to the chassis rail by a mounting bracket.

FIGS. 2-5 further illustrate the tag axle 100. More specifically, FIG. 2 is a left side sectional-view illustration of a tag axle 100, in accordance with an exemplary embodiment of the present invention, in the stowed position attached to the chassis rail 101 by a mounting bracket 202 with the rear axle 102 removed. The tag axle 100, as illustrated in FIG. 2, includes a hydraulically actuated swing arm assembly 220, an axle assembly 201, preferably having at least one wheel 215, a mounting bracket 202, and two hydraulic cylinders 203 (only one is visible in FIG. 2). The mounting bracket 202 has a first end 208 and a second end 209. The first end 208 of the mounting bracket 202 is attached to the rear end of the chassis rails 101 of the agricultural vehicle. The mounting bracket 202 is preferably bolted to the chassis, but may be attached using alternate methods, such as by welding. The swing arm assembly 220 has a first end 204 and a second end 205. The first end 204 of the swing arm assembly 220 is pivotally attached proximate to the second end 209 of the mounting bracket 202. The second end 205 of the swing arm assembly 220 is pivotally attached to the axle assembly 201. The hydraulic cylinders 203 also have a first end 206 and a second end 207. The first end 206 of the hydraulic cylinder 203 is pivotally connected to the first end 208 of the mounting bracket 202. The second end 207 of the hydraulic cylinder 203 is pivotally connected to the axle assembly 201 by way of the swing arm assembly 220. The hydraulic cylinder 203 actuates the raising and the lowering of the swing arm assembly 220, which in turn raises and lowers the axle assembly 201 to the stowed and deployed positions, respectively. Those skilled in the art will appreciate that there are different telescoping devices, aside from hydraulic cylinders, that can actuate raising and lowering of the swing arm assembly. For example, and not limitation, the telescoping device may be actuated by a hand crank or an electric motor. Although FIG. 2 is a left side sectional-view illustration of the tag axle assembly 100, those of skill in the art will appreciate that the right side of the tag axle assembly 100 is substantially similar to the left side.

Figure 3:
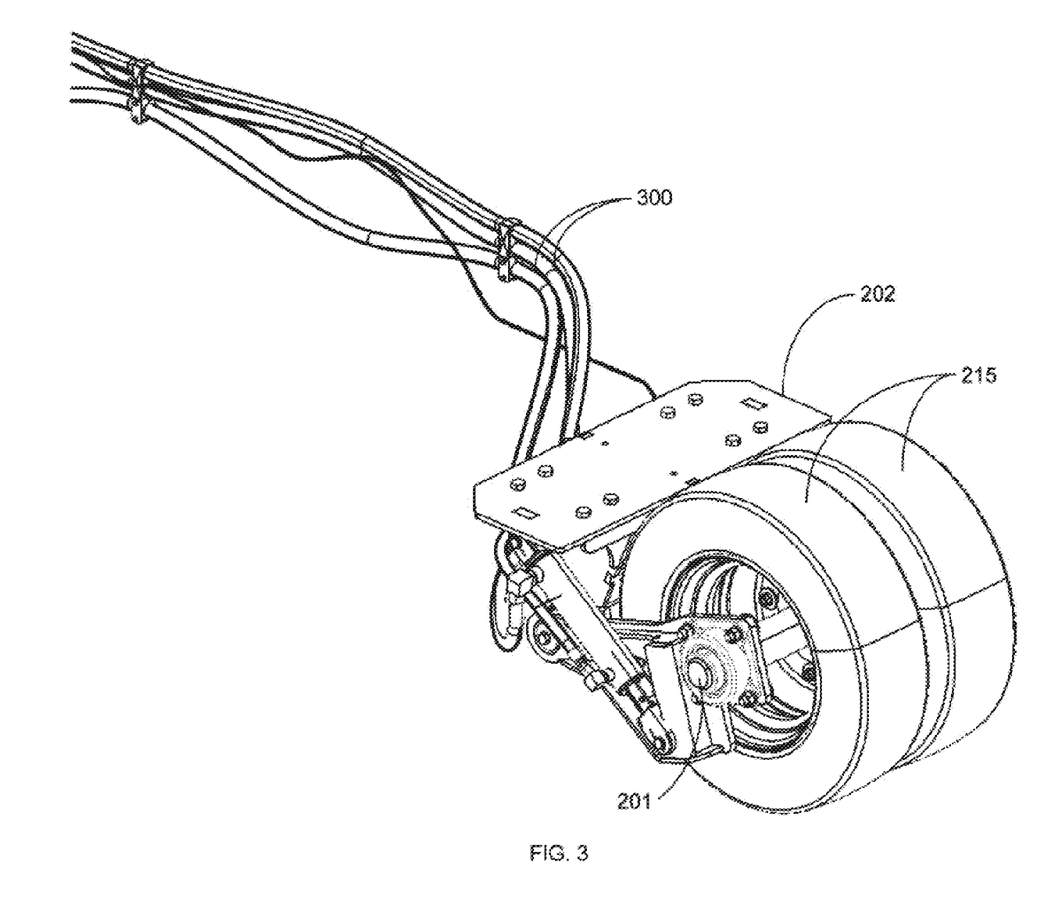
FIG. 3 is an angled, aerial sectional-view illustration with the chassis rail and rear axle removed of a tag axle, in accordance with an exemplary embodiment of the present invention.

FIG. 3 is an angled, aerial sectional-view illustration of a tag axle 100, in accordance with an exemplary embodiment of the present invention, with the chassis rail 101 and rear axle 102 removed. The tag axle 100 can be attached to the chassis rails 101 of the agricultural vehicle by a mounting bracket 202. The mounting bracket 202 is adapted to install and remove the tag axle 100 from the agricultural vehicle as desired. Further, to supply hydraulic pressure to the axle assembly 201, hydraulic pressure and return plumbing lines 300 are attached.

Figure 4:
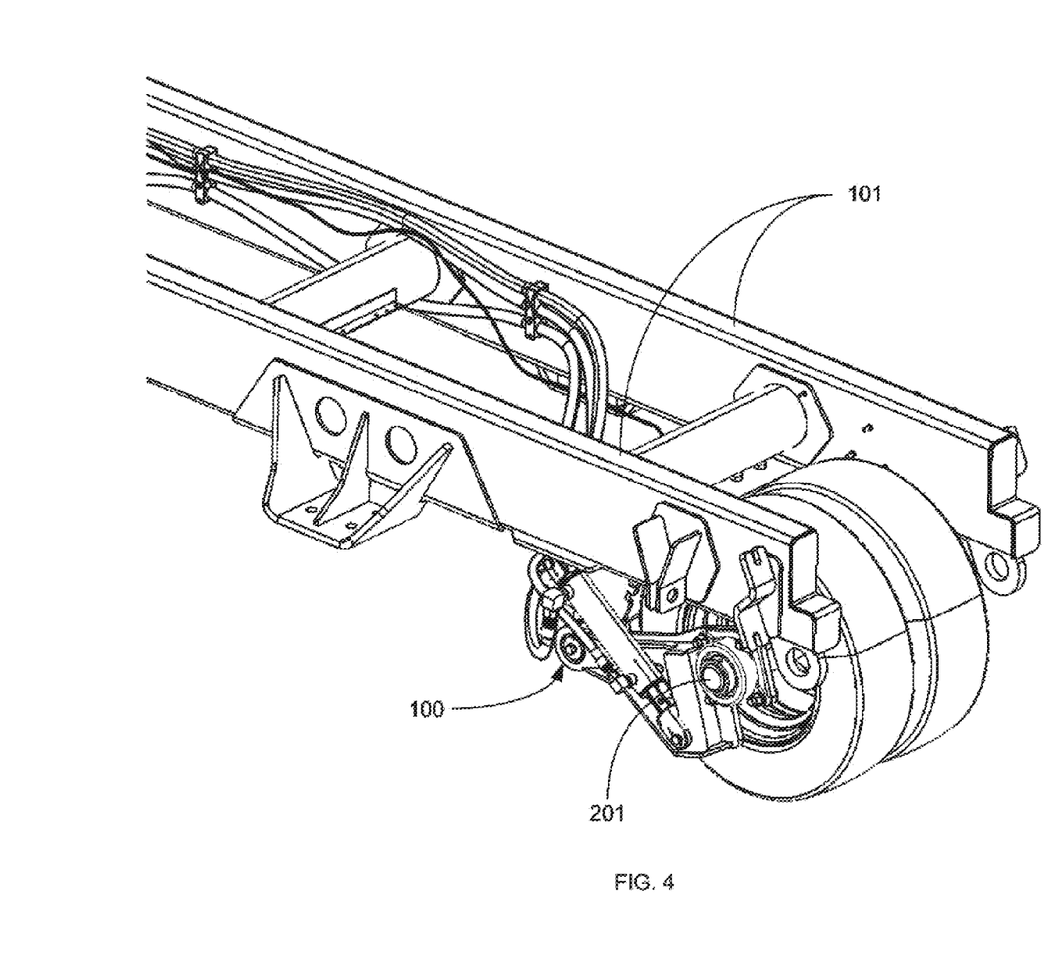
FIG. 4 is an angled, sectional aerial-view illustration of a tag axle, in accordance with an exemplary embodiment of the present invention, in the stowed position mounted to the chassis rail.

FIG. 4 is an angled, sectional aerial-view illustration of a tag axle 100, in accordance with an exemplary embodiment of the present invention, in the stowed position mounted to the chassis rails 101 of the agricultural vehicle. The width of the axle assembly 201 is preferably narrow enough so that it fits in between the two chassis rails 101 when in the stowed position. It is desirable for the axle assembly 201 to be stowed between the chassis rails 101 so that the axle assembly 201 does not interfere with the operation of the agricultural vehicle when traveling uphill, downhill, or over obstructions in the field. Alternatively, the axle assembly 201 may be stowed in another position that does not interfere with the operation of the vehicle, such as directly behind the rear wheels.

Figure 5:
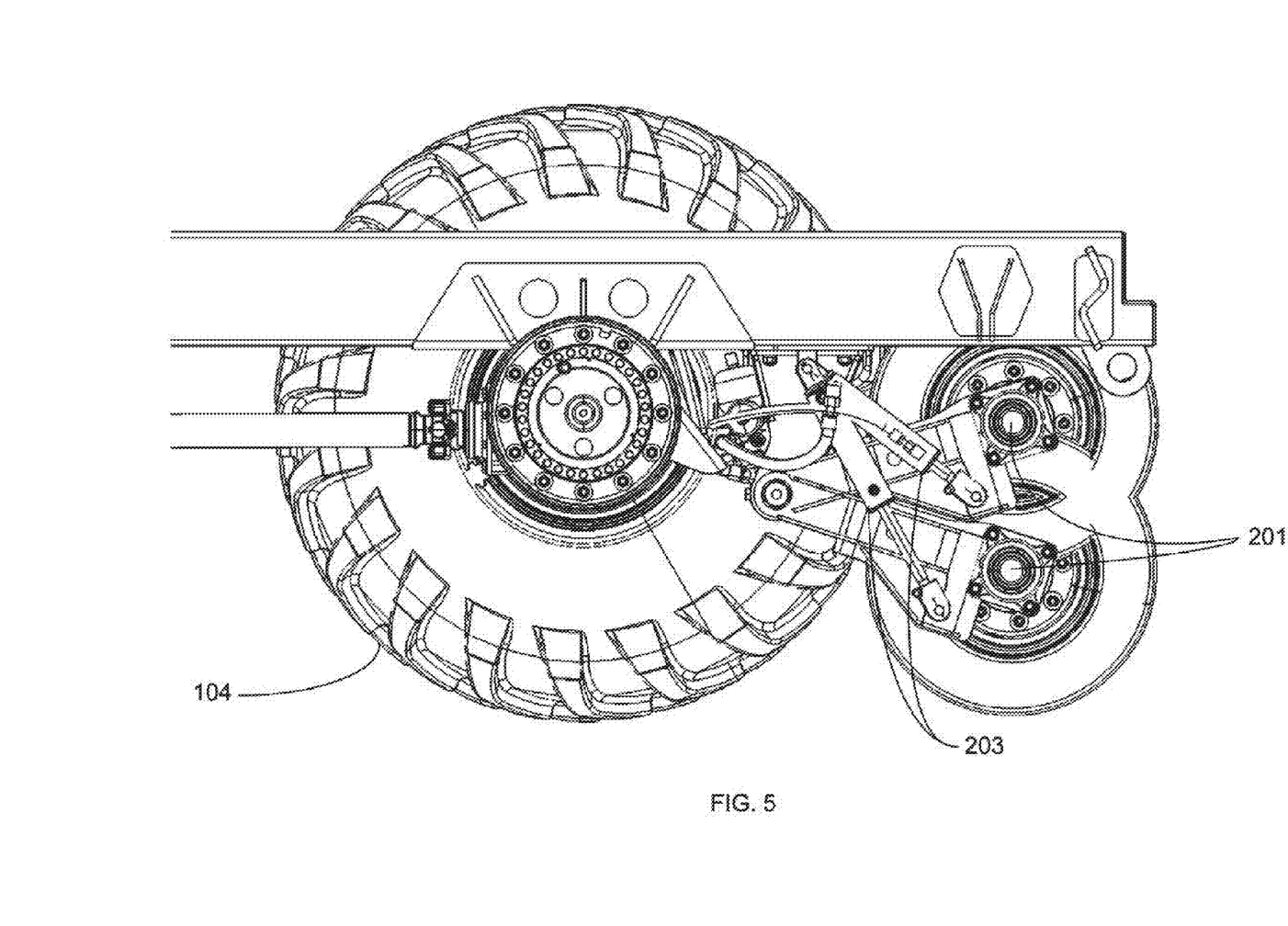
FIG. 5 is a left side sectional-view illustration of a tag axle, in accordance with an exemplary embodiment of the present invention, in both the stowed and deployed positions with the rear axle and rear wheel shown.

FIG. 5 is a left side sectional-view illustration of a tag axle 100, in accordance with an exemplary embodiment of the present invention, in both the stowed and deployed positions with the rear axle 201 and rear wheel 104 shown. The raised axle assembly 201 is in the stowed position. The lowered axle assembly 201 is in the deployed position. As shown in FIG. 5, the axle assembly's 201 axis of rotation is aligned with the central axis of the agricultural vehicle. To transition the axle assembly 201 to the deployed position, the hydraulic cylinders 203 expand to actuate the swing arm assembly 220 which pivots towards the ground to facilitate the movement of the axle assembly 201 to the ground-engaging position.

Figure 6:
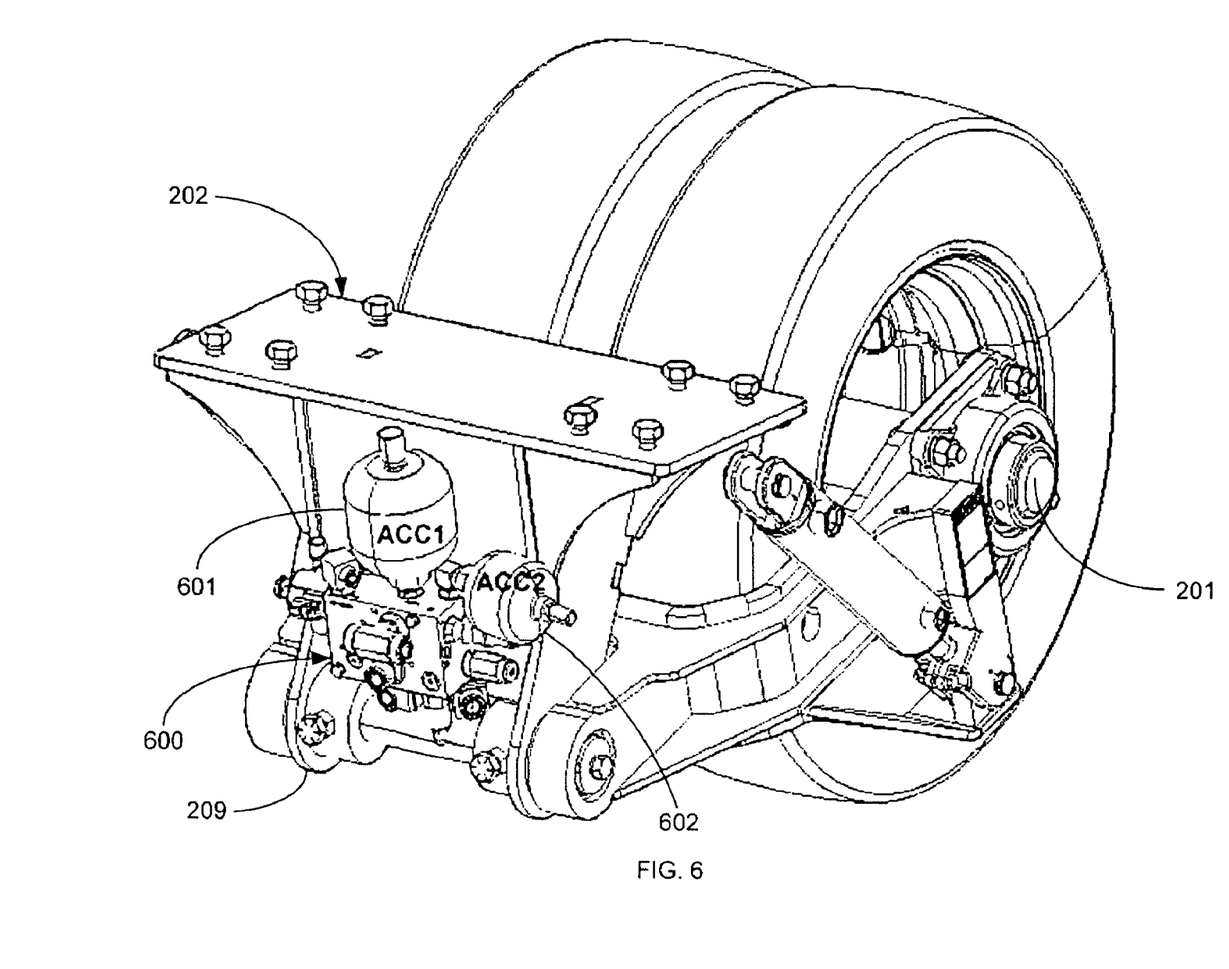
FIG. 6 is a front angled-view illustration of a tag axle, in accordance with an exemplary embodiment of the present invention, showing the valve block attached to the mounting bracket and two hydraulic accumulators, ACC1 and ACC2.

FIG. 6 is a front angled-view illustration of a tag axle assembly 100, in accordance with an exemplary embodiment of the present invention, showing the valve block 600 attached to the mounting bracket 202 and two hydraulic accumulators, ACC1 601 and ACC2 602. Specifically, the valve block 600 is attached to the second end 209 of the mounting bracket 202. The valve block 600 controls the amount of hydraulic pressure provided to the axle assembly 201. Contained within the valve block 600 are two adjustable pressure valves, UP and RV2 (not shown). Valve UP sets the axle assembly operating pressure and RV2 is the main pressure relief valve for the axle assembly and is preferably set 300 psi higher than the UP pressure setting. Hydraulic pressure and return plumbing lines 300 (not shown) are connected to the valve block 600 from a common supply tank, which also may supply hydraulic oil to the vehicle steering and boom control valves. Those skilled in the art will appreciate that a common supply tank is not required and that a plurality of supply tanks can be used. Two hydraulic accumulators are mounted to the valve block 600 on ports ACC1 601 and ACC2 602. Accumulator ACC1 601 preferably stores energy when the axle assembly 201 is deployed and provides suspension capabilities for the axle assembly 201 so it can properly absorb bumps or small obstructions. In an alternate embodiment in which hydraulics are not used, a spring or shock absorber may be added to provide suspension capabilities. ACC1 601 may be pre-charged to different pressures depending on the load of the axle assembly 201. ACC2 602 preferably stores energy when the axle assembly 201 is in the stowed position to prevent cycling of the UP valve.

Figure 7:
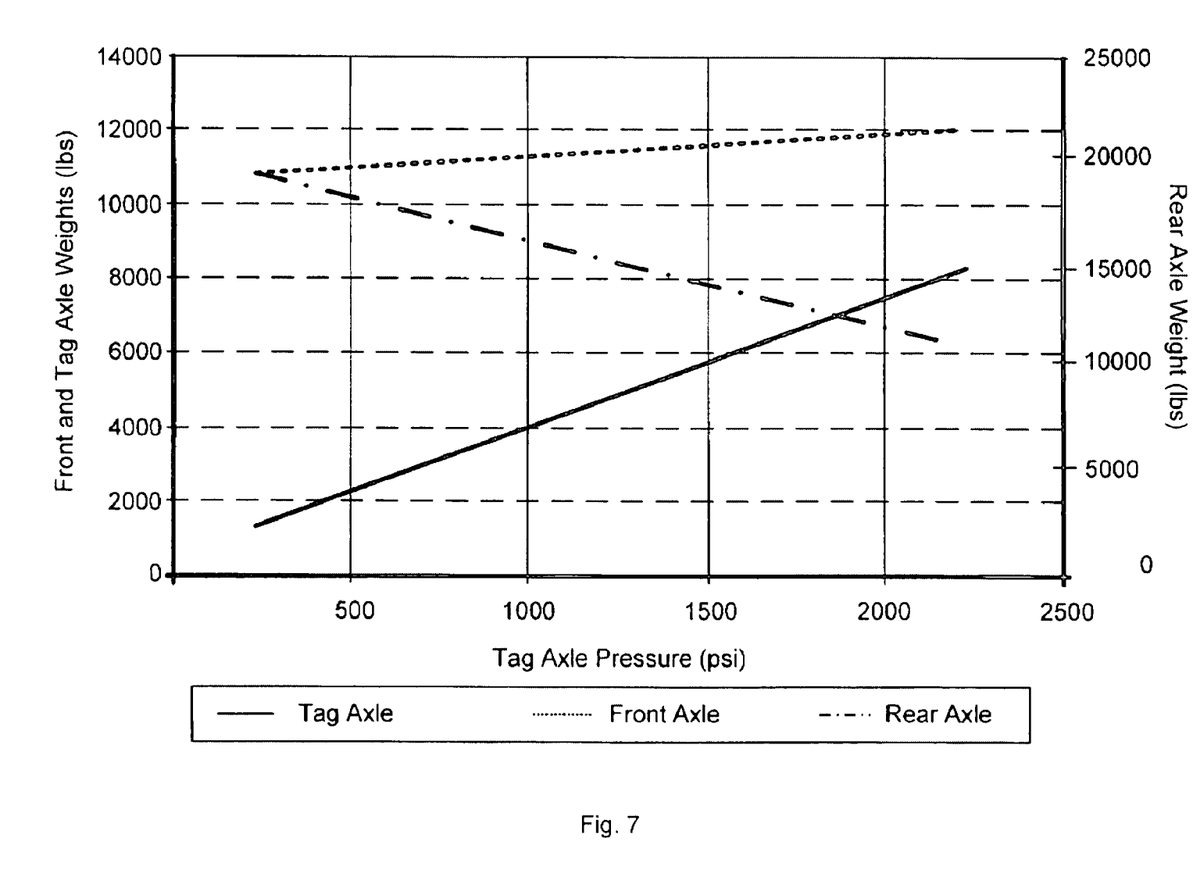
FIG. 7 graphically shows the relationship between the tag axle hydraulic pressure and the weight of the agricultural vehicle applied to the front, rear, and tag axles.

FIG. 7 graphically shows the relationship between the tag axle hydraulic pressure and the weight of the agricultural vehicle applied to the front, rear, and tag axles. Because the axle assembly 201 is raised and lowered using hydraulic pressure, this graph shows the axle pressure and its affect on the front and rear axles, thereby indicating how far the axle assembly 201 should be lowered in order to effectively distribute the weight of the vehicle across axles and reduce the overall weight per axle of the vehicle. Those skilled in the art will appreciate that this graph is provided to illustrate loading off the various axles specific for an axle assembly 201 and associated vehicle. If the location of the axle assembly differs, the load weights are altered, or the axle assembly is raised and lowered by a different means, the graph may change.

Figure 8:
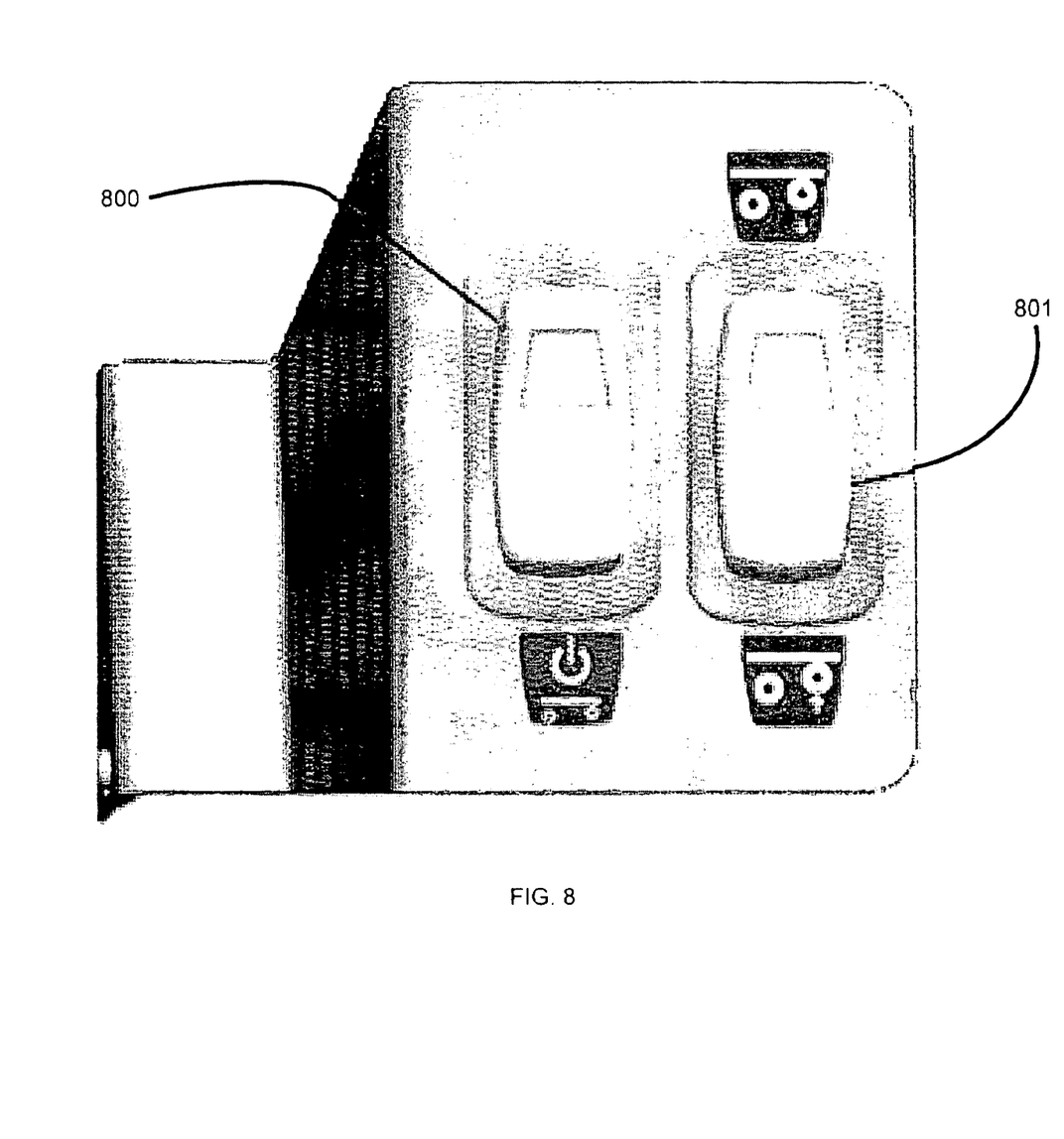
FIG. 8 is a top-view illustration of Switch 1 and Switch 2, which are used to power and disable, and raise and lower the tag axle, respectively, in accordance with an exemplary embodiment of the present invention.

FIG. 8 is a top-view illustration of Switch 1 800 and Switch 2 801, which are used to power and disable, and raise and lower the tag axle assembly 100, respectively, in accordance with an exemplary embodiment of the present invention. Operator actuation of the axle assembly 201 is controlled through the use of Switch 1 800 and Switch 2 801, which are preferably mounted in the vehicle cab. Alternatively, those skilled in the art are aware of different ways, other than the use of operator switches, to power, disable, raise, and lower the axle assembly 201. Switch 1 800 is preferably a momentary switch adapted to power and disable the axle assembly 201. Switch 2 801 is preferably a 3-position switch adapted to raise and lower the axle assembly 201. Switch 1 800 and Switch 2 801 are preferably connected by a harness to a power source within the cab relay panel (not shown). A second wire harness connects Switch 2 800 to two solenoids SV1 and SV2 (not shown), which are located on the valve block 600. SV1 controls the raise and lower functions of the axle assembly 201 and SV2 controls the ability of hydraulic oil to flow in or out of the hydraulic cylinders 203. As a safety mechanism, Switch 2 801 can be configured to be powered only when Switch 1 800 is in the "on" position. Hydraulic pressure to the tag axle assembly 100 when in the stowed or deployed position is maintained even if Switch 1 800 is turned off, thereby holding the axle assembly 201 in either the stowed or deployed position until the next cycling of Switch 1 800 and Switch 2 801.

Figure 9A:
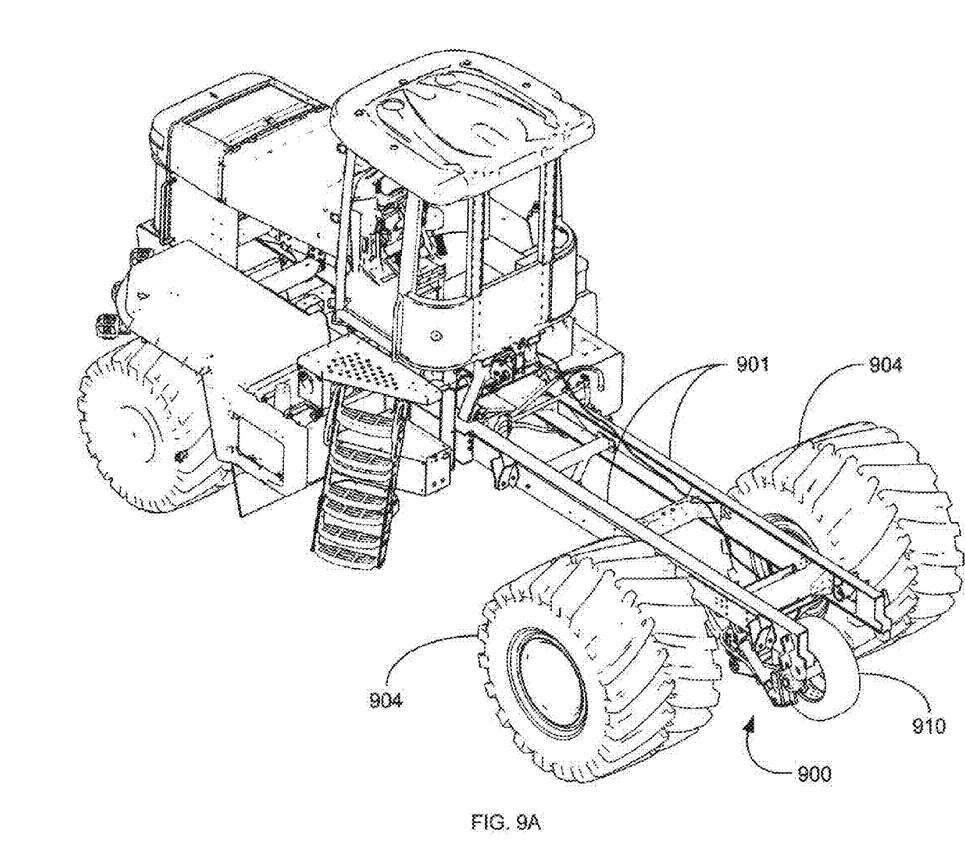
FIGS. 9A-B are illustrations of a tag axle, in accordance with an exemplary embodiment of the present invention, installed behind the rear axle and in between two chassis rails of the agricultural vehicle.
Figure 9B:
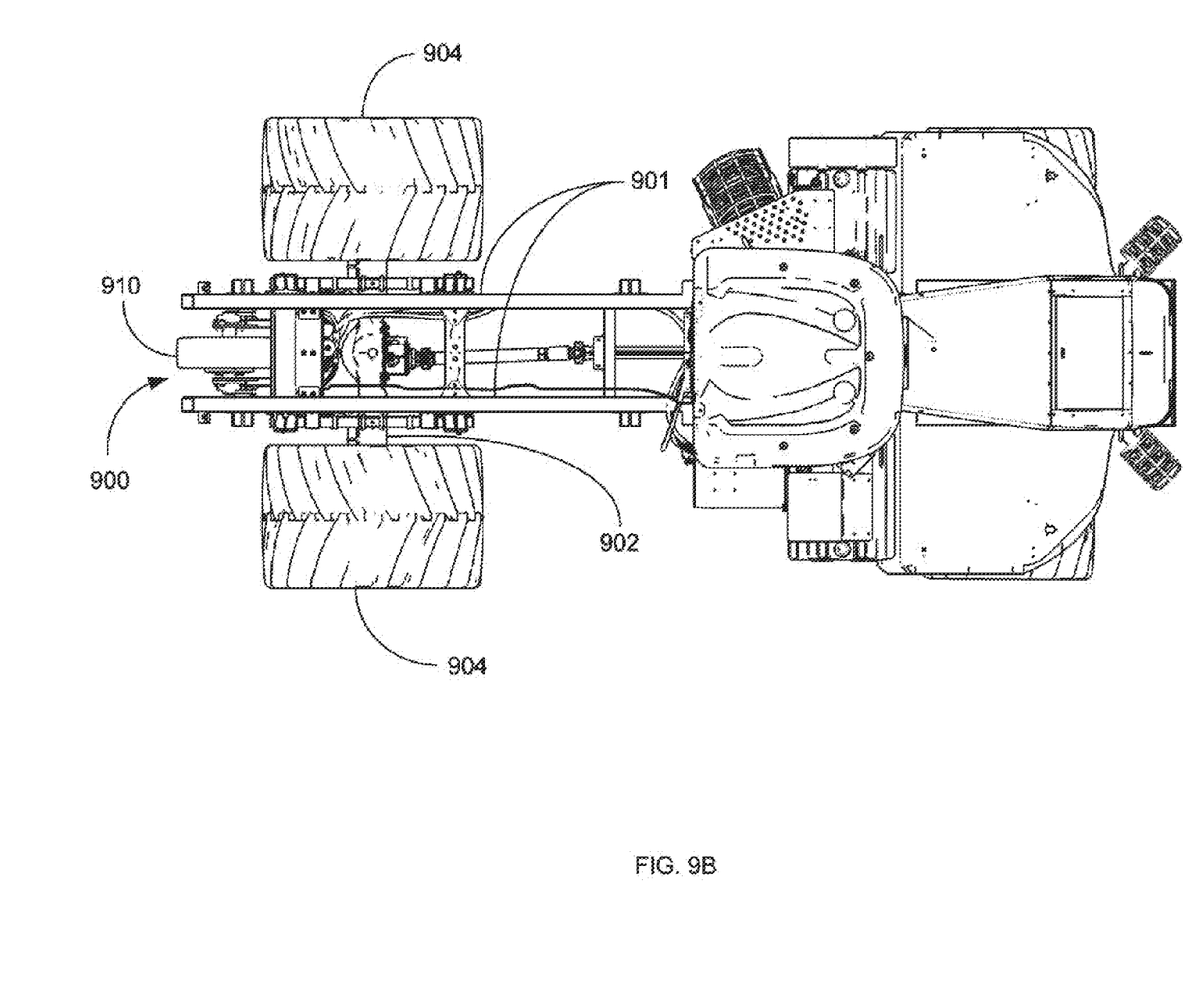

In yet another embodiment, shown in FIGS. 9A and 9B the tag axle assembly 900 may be installed on a four wheeled agricultural vehicle. In this embodiment, due to the increased number of wheels on the vehicle, it may be possible to use only one wheel assembly 910 on the tag axle assembly 900. This can reduce manufacturing and maintenance costs and decrease the weight of the tag axle assembly 900.

FIGS. 9A-B are illustrations of a tag axle assembly 900, in accordance with yet another exemplary embodiment of the present invention, installed behind the rear axle 902 and in between two chassis rails 901 of the agricultural vehicle. Those of skill in the art will appreciate that the vehicle shown is but one example of a suitable vehicle for use with the tag axle assembly 900 of the present invention. The tag axle assembly 900 is preferably attached proximate to the rear of the chassis rails 901 by a mounting bracket. Moreover, the tag axle assembly 900 is preferably centrally aligned with, and located behind, the rear axle 902. In other words, the tag axle assembly 900 is preferably located behind the rear axle 902 and in between the two rear wheels 904 located at proximate ends of the rear axle 902 of the vehicle. This preferred location allows the tag axle assembly 900 to absorb some of the load from the rear axle 902 thereby reducing the overall weight per axle of the agricultural vehicle. In vehicles having an alternative chassis design, the tag axle assembly may be positioned in alternate locations selected based on the desire to allow tag axle operation without significantly compromising ground clearance when in off-road environments.

Figure 10:
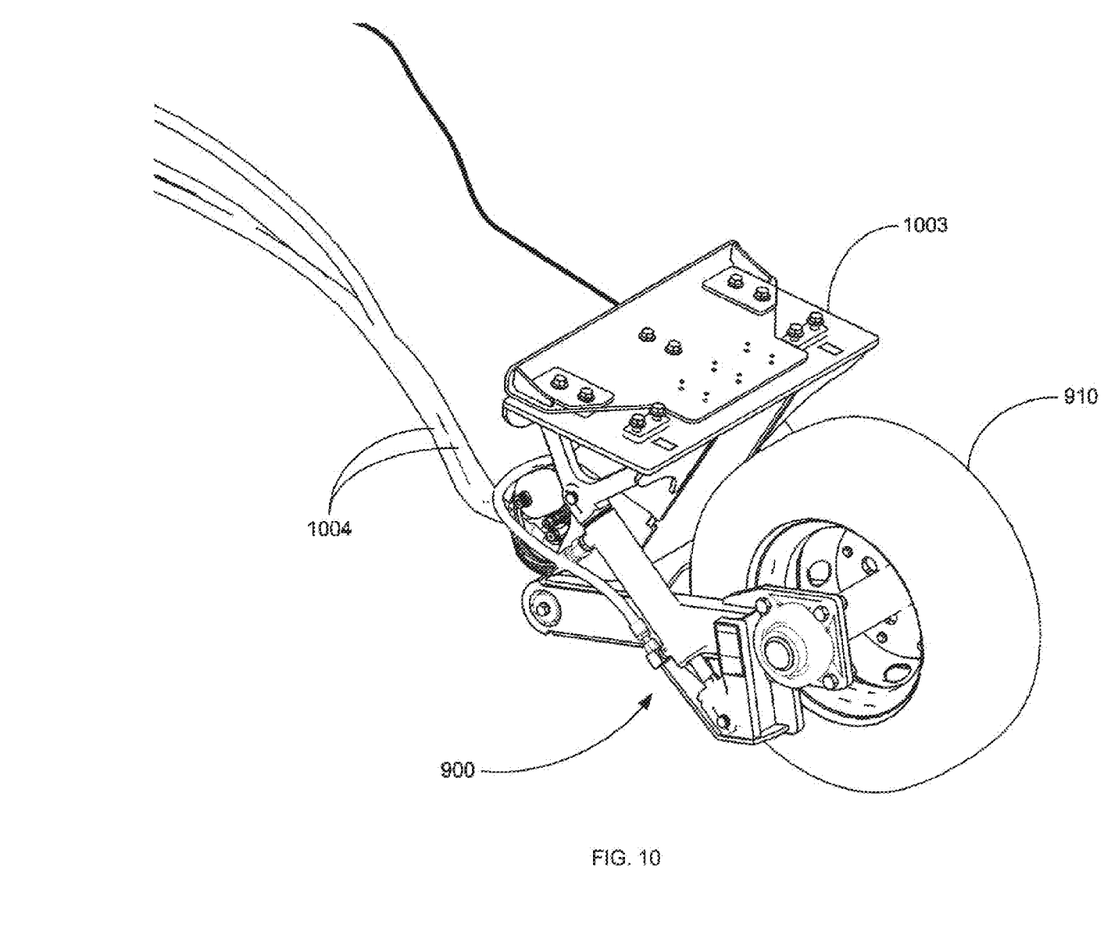
FIG. 10 is an angled, aerial sectional-view illustration with the chassis rail and rear axle removed of a tag axle, in accordance with an exemplary embodiment of the present invention.
Figure 11:
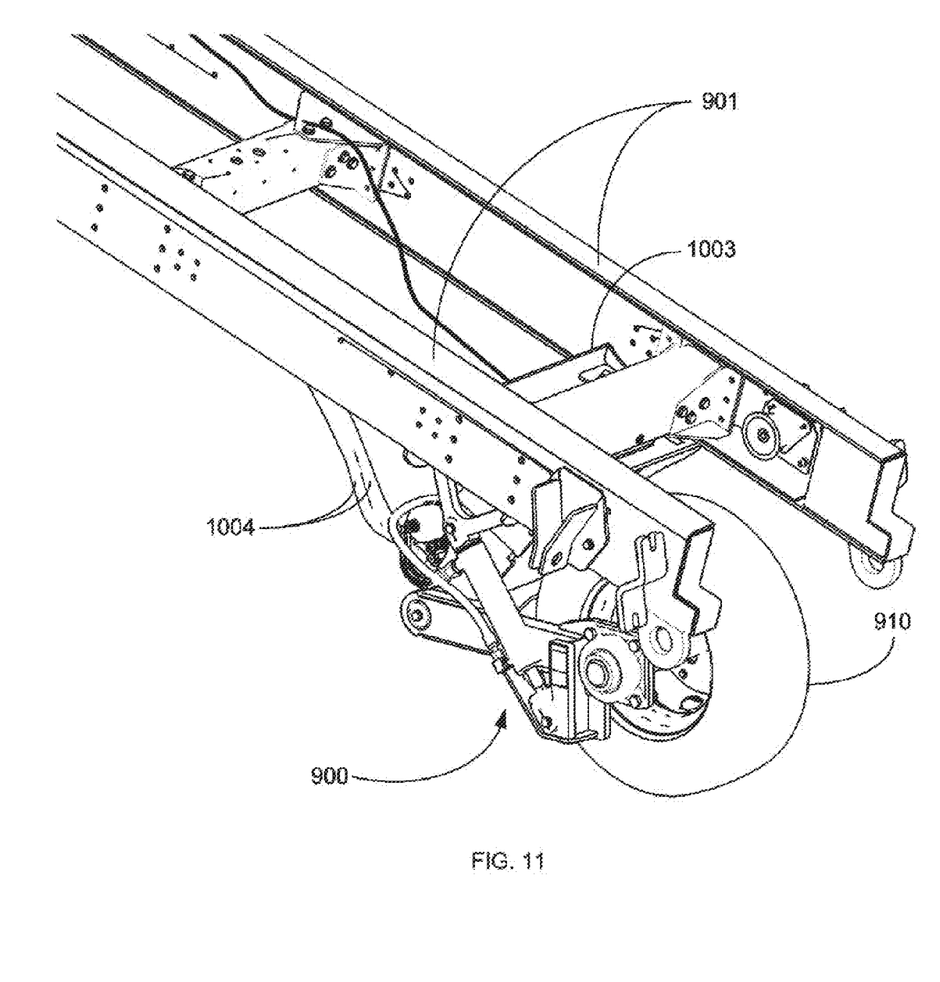
FIG. 11 is an angled, sectional aerial-view illustration of a tag axle, in accordance with an exemplary embodiment of the present invention, in the stowed position mounted to the chassis rail.

FIGS. 10-11 further illustrate the tag axle assembly 900. FIG. 10 is an angled, aerial sectional-view illustration of a tag axle assembly 900, in accordance with an exemplary embodiment of the present invention, with the chassis rails 901 and rear axle 902 removed. The tag axle assembly 900 can be attached to the chassis rails 901 of the agricultural vehicle by a mounting bracket 1003. The mounting bracket 1003 is adapted to install and remove the tag axle assembly 900 from the agricultural vehicle as desired. Further, to supply hydraulic pressure to the tag axle assembly 900, hydraulic pressure and return plumbing lines 1004 are attached.

FIG. 11 is an angled, sectional aerial-view illustration of a tag axle assembly 900, in accordance with an exemplary embodiment of the present invention, in the stowed position mounted to the chassis rails 901 of the agricultural vehicle. The width of the tag axle assembly 900 is preferably narrow enough so that it fits in between the two chassis rails 901 when in the stowed position. It is desirable for the tag axle assembly 900 to be stowed between the chassis rails 901 so that the tag axle assembly 900 does not interfere with the operation of the agricultural vehicle when traveling uphill, downhill, or over obstructions in the field. Alternatively, the tag axle assembly 900 may be stowed in another non-obstructing position, such as directly behind the rear wheels 904.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

For example, the use of the tag axle assembly 100, 900 is not limited to use on the particular agricultural vehicles shown. Also, the number of wheel assemblies 215, 910 used on the tag axle assembly 100, 900 can change and is dictated by, among other things, the weight of the vehicle, the number of wheels and axles on the vehicle, and local vehicle weight restrictions. In other words, the two wheeled tag axle assembly 100 is not limited to use on a three wheeled agricultural vehicle; and, the use of the one wheeled tag axle assembly 900 is not limited to use on a four wheeled agricultural vehicle. Nor is the present invention limited to at most two wheels. The embodiments pictured in the figures are illustrative only and should in no way be construed as a limitation on this invention.

We claim:

1. A tag axle for use with an agricultural vehicle having a chassis with a front, a rear, and two spaced apart side rails, a front axle attached to said chassis having one or more wheels, a rear axle attached to the chassis having at least a first wheel and a second wheel, wherein the first and second wheels are located on distal sides of the rear axle, the tag axle comprising:
   an axle assembly having an axle and at least one wheel;
   a mounting bracket having a first end and a second end, the first end being adapted to couple to the chassis of the agricultural vehicle;
   a swing arm assembly having a third end and a fourth end, the third end of the swing arm assembly being pivotally attached to the mounting bracket proximate to the second end of the mounting bracket and the fourth end of the swing arm assembly being pivotally connected to the axle assembly; and
   a telescoping device having a fifth end and a sixth end, the fifth end being pivotally connected to first end of the mounting bracket and the sixth end being pivotally connected to the axle, said telescoping device actuating the raising and lowering of the axle assembly wherein the agricultural vehicle has a single front centrally aligned wheel, and wherein a wheel of the axle assembly is aligned with the front wheel of the agricultural vehicle.

2. The tag axle of claim 1, wherein the telescoping device is pivotally connected to the axle via the swing arm assembly.

3. The tag axle of claim 1, wherein the axle assembly is positioned behind rear axle.

4. The tag axle of claim 1, wherein the axle assembly has a width less than the space between the chassis side rails.

5. The tag axle of claim 1, wherein the axle assembly is adapted to be lowered into a deployed position and raised into a stowed position.

6. The tag axle of claim 1, wherein the telescoping device comprises at least one hydraulic cylinder.

7. The tag axle of claim 6, further comprising a first hydraulic accumulator adapted to store energy when the axle assembly is lowered and further adapted to provide suspension capabilities for the axle assembly.

8. The tag axle of claim 6, further comprising a second hydraulic accumulator adapted to store energy when the axle assembly is in the raised position.

9. The tag axle of claim 6, further comprising at least one valve block for controlling hydraulic pressure.

10. The tag axle of claim 9, wherein the valve block is attached to the second end of the mounting bracket.

11. The tag axle of claim 9, further comprising hydraulic pressure and return plumbing lines attached to the valve block.

12. The tag axle of claim 9, further comprising a plurality of adjustable pressure valves contained within the valve block, wherein a first of said plurality of adjustable pressure valves controls operating pressure of the axle assembly and a second of said plurality of adjustable pressure valves provides pressure relief for the axle assembly.

13. The tag axle of claim 12, wherein the second of said plurality of adjustable pressure valves is set approximately 300 psi higher than the first of said plurality of adjustable pressure valves.

14. The tag axle of claim 1, further comprising a first switch for disabling movement of the axle assembly.

15. The tag axle of claim 1, further comprising a second switch for raising and lowering the axle assembly.

16. The tag axle of claim 15, further comprising a plurality of solenoids coupled to the second switch, wherein a first solenoid of said plurality of solenoids controls the raising of the axle assembly and a second solenoid of said plurality of solenoids controls flow of hydraulic oil.

17. The tag axle of claim 1, wherein the tag axle reduces the weight per axle of the agricultural vehicle when the axle assembly is in the lowered position.

18. The tag axle of claim 1, wherein the tag axle reduces the weight of the agricultural vehicle supported on the rear axle.

19. The tag axle of claim 1, wherein the agricultural vehicle has a central axis extending from the front to the rear of the chassis and the axle assembly transitions from a stowed position to a deployed position in a direction perpendicular to the central axis.

20. The tag axle of claim 19, wherein the axle assembly moves from the stowed position to the deployed position using arcuate motion.

21. A tag axle for use with an agricultural vehicle having a chassis with a front, a rear, and two spaced apart side rails, a front axle attached to said chassis having one or more wheels, a rear axle attached to the chassis having at least a first wheel and a second wheel, wherein the first and second wheels are located on distal sides of the rear axle, the tag axle comprising:
  an axle assembly having an axle and at least one wheel;
  a mounting bracket having a first end and a second end, the first end being adapted to couple to the chassis of the agricultural vehicle;
  a swing arm assembly having a third end and a fourth end, the third end of the swing arm assembly being pivotally attached to the mounting bracket proximate to the second end of the mounting bracket and the fourth end of the swing arm assembly being pivotally connected to the axle assembly; and
  a telescoping device having a fifth end and a sixth end, the fifth end being pivotally connected to the first end of the mounting bracket and the sixth end being pivotally connected to the axle, said telescoping device actuating the raising and lowering of the axle assembly wherein the telescoping device comprises,
  at least one hydraulic cylinder, and
  at least one valve block for controlling hydraulic pressure in the hydraulic cylinder wherein the valve block is attached to the second end of the mounting bracket.

* * * * *